United States Patent [19]

Burkhart

[11] Patent Number: 5,603,759
[45] Date of Patent: Feb. 18, 1997

[54] STABLE, CEMENT-BONDED, OVERHEAD SPRAYED INSULATING MIXES AND RESULTANT LININGS

[75] Inventor: Andrew M. Burkhart, Pittsburgh, Pa.

[73] Assignee: Indresco Inc., Dallas, Tex.

[21] Appl. No.: 454,481

[22] Filed: May 30, 1995

Related U.S. Application Data

[63] Continuation-in-part of Ser. No. 16,391, Feb. 11, 1993.

[51] Int. Cl.$^6$ ............................................. C04B 7/32
[52] U.S. Cl. .................... 106/692; 106/694; 106/696; 106/38.3; 106/38.35; 501/124
[58] Field of Search .................... 106/692, 694, 106/38.3, 696, 38.35; 501/124

[56] References Cited

U.S. PATENT DOCUMENTS

| | | | |
|---|---|---|---|
| 3,360,594 | 12/1967 | Criss | 501/124 |
| 3,507,332 | 4/1970 | Venable, Jr. et al. | 106/692 |
| 3,992,214 | 11/1976 | Petrak et al. | 106/692 |
| 4,088,502 | 5/1978 | La Bar | 106/692 |
| 4,111,711 | 9/1978 | Kiehl et al. | 106/692 |
| 4,400,474 | 8/1983 | Copperthwaite et al. | 501/124 |
| 4,442,050 | 4/1984 | Takuo | 264/30 |
| 4,514,531 | 4/1985 | Kleeb et al. | 501/124 |
| 4,615,953 | 10/1986 | Ichikawa et al. | 428/699 |
| 4,656,146 | 4/1987 | Schlett et al. | 501/124 |
| 4,680,279 | 7/1987 | Kleeb | 501/125 |
| 4,687,752 | 8/1987 | Peters | 501/124 |
| 4,710,225 | 12/1987 | Rucker | 501/124 |
| 4,751,204 | 6/1988 | Kyoden et al. | 501/124 |
| 4,901,985 | 2/1990 | Soofi | 266/281 |
| 4,943,544 | 7/1990 | McGarry et al. | 106/692 |
| 4,970,180 | 11/1990 | Sugino et al. | 106/692 |
| 4,992,397 | 2/1991 | Hughes, Jr. | 501/124 |
| 4,993,692 | 2/1991 | Brown et al. | 266/229 |
| 5,036,029 | 7/1991 | Johnson | 501/121 |
| 5,073,525 | 12/1991 | Cheng et al. | 501/81 |
| 5,549,745 | 8/1996 | Langenohl et al. | 106/692 |

FOREIGN PATENT DOCUMENTS

| | | | |
|---|---|---|---|
| 642924 | 6/1962 | Canada | 501/124 |
| 743153 | 9/1966 | Canada | 501/124 |
| 59-22776 | 12/1984 | Japan | 106/692 |
| 60-071569 | 4/1985 | Japan | 106/692 |
| 60-246273 | 12/1985 | Japan | 106/692 |
| 117210 | 6/1986 | Japan . | |
| 964148 | 7/1964 | United Kingdom | 501/124 |
| 85/02397 | 6/1985 | WIPO | 106/692 |

*Primary Examiner*—Deborah Jones
*Attorney, Agent, or Firm*—John L. Sigalos

[57] ABSTRACT

A pulverulent mix, sprayable when mixed with a liquid for forming a stable, cement-bonded insulating refractory which can be sprayed onto vertical and overhead surfaces without deformation, comprising a lightweight and/or dense refractory aggregate, a calcium aluminate cement, a microsilica, a ball clay, and a superfine refractory. The superfine refractory comprises 2 to 15 wt. % of the mix and the −325 mesh portion of the mix being from about 40 to 60 wt. %.

11 Claims, No Drawings

STABLE, CEMENT-BONDED, OVERHEAD SPRAYED INSULATING MIXES AND RESULTANT LININGS

CROSS-REFERENCE TO RELATED APPLICATION

The instant application is a continuation-in-part of U.S. application Ser. No. 016,391 filed Feb. 11, 1993.

BACKGROUND OF THE INVENTION

This invention relates to sprayed cement-bonded insulating mixes that can be sprayed overhead without falling. These mixes are used to form refractory working linings in high temperature environments, such as petrochemical or metallurgical process vessels.

The parent application is directed to working linings in over-the-road (OTR) ladles which are used throughout the aluminum industry to transport molten aluminum. The molten metal may be transported on public roads, over great distance or to local plant locations where the metal is further processed.

Ideally, over-the-road ladles require a lightweight refractory lining. The ability to maintain a minimum weight is essential due to weight restrictions on many roads. The refractory should resist aluminum penetration, which both increases weight and reduces the insulating value of the lining. Penetration also increases the danger of a molten metal leak from the ladle that could cause serious harm. Even if no leakage occurs, ladle linings must eventually be replaced when metal penetration increases lining weight beyond an acceptable limit and/or the molten metal suffers excessive heat loss during transit. Finally, repairs or replacement of the penetrated ladle lining should be completed quickly so that the ladle can be back in service as soon as possible.

One of the mixes disclosed in the parent application is a fireclay-based spray mix which was found to be more erosion-resistant than the others. While generally satisfactory for use on over-the-road ladles, it has been found that such mixes will slump and are not suitable in spray coating of the overhead areas of heaters, boilers, petrochemical or metallurgical vessels.

Cement-bonded, insulating spray mixes based on conventional castable and gun mix technology were tempered to a pumpable slurry consistency. These mixes, like those discussed above, do not have sufficient cohesion or adhesion to be sprayed onto overhead surfaces, thereby severely restricting their commercial acceptance.

Sprayable refractory compositions for ferrous metallurgical applications have been developed and patented. Cheng et al (U.S. Pat. No. 5,073,525) discloses a low density, magnesia based tundish composition which can be applied by gunning, spraying, or trowelling. Johnston (U.S. Pat. No. 5,036,029) also teaches a sprayable magnesia based refractory lining. Soofi (U.S. Pat. No. 4,901,985) discloses a device for spraying a refractory composition onto a tundish or ladle. Ichikawa et al (U.S. Pat. No. 4,615,953) teaches the use of a magnesia coating on an alumino-silicate layer as a means of improving a tundish lining.

The compositions of these references have insufficient cohesiveness to be sprayed onto the overhead surfaces of heaters, boilers, petrochemical or metallurgical vessels, particularly when a thick lining is required.

SUMMARY OF THE INVENTION

The present invention overcomes the problems of prior art spray mixes to provide a readily applicable, non-slumping spray mix that will adhere to vertical and overhead surfaces, without reliance on unusual, excessive, and thereby costly, anchoring systems.

Briefly, the present invention comprises a pulverulent sprayable mix comprising a lightweight and/or dense refractory aggregate, a calcium aluminate cement, a surferfine refractory, and a plasticizer. The −325 mesh portion of this mix must be from 40 to 60 wt. %, preferably 50 wt. %. In addition, the percentage of non-cement superfines, those less than 10 microns should be from 2 to 15 wt. %, preferably about 10 wt. %.

This invention also relates to the resultant linings.

DETAILED DESCRIPTION

It is necessary that the sprayable mix of the instant invention contains a lightweight and/or dense refractory aggregate, calcium aluminate cement, a superfine refractory, preferably microsilica and a plasticizer, preferably ball clay. The −325 mesh portion preferably should be 50 wt. % of the mix. The less-than −6 micron component should be about 10 wt. % of the mix.

With respect to the dense or lightweight aggregate, any conventional refractory aggregate can be used. The mesh size is preferably −28 mesh through fines. The preferred dense aggregates are calcined fireclay, pyrophyllite, vitreous or fused silica, and lightweight aggregates such as perlite, vermiculite, Verilite (an expanded fireclay), diatomite, bubble alumina, expanded polystyrene, or mixtures thereof, can also be utilized for this purpose.

If the intended service temperature exceeds 2400° F., crude kyanite is added to counteract shrinkage and maintain volume stability.

As to the plasticizer, ball clay, bentonite, or conventionally-used organic compounds can be used, but it is preferred to use ball clay.

As to proportions, for each 100 wt % one can utilize 45 to 88 wt. aggregate, 10 to 40 wt. % cement, 1 to 5 wt. % ball clay, and 1 to 10 wt. % microsilica. Preferably, the compositions contain coarse aggregate, cement, 5 to 7 wt. % microsilica and 2 wt. % ball clay.

Of critical importance in the instant invention is the addition of a superfine refractory to the composition "Superfine" as used herein, means particles that are essentially less than 10 microns, preferably less than 5 microns. Such materials are preferably a microsilica, ball clay, reactive alumina, pigment grade chromic oxide, or other fine refractory particles of 5 microns or less, or mixtures thereof. It has been found that the use of a superfine refractory unexpectedly increases the cohesiveness of the spray mix to the point where thicknesses of 5 inches or more of the sprayable composition can be achieved without slumping or falling, while at the same time the pumpability of the slurry is not compromised.

Equally important is the fact that utilization of these superfine particles, unlike ball clays and/or bentonites does not increase the water demand, and these fines, unlike soluble gums and cellulosics, are not subject to migration during drying.

It is preferred to add 4 to 9 wt. % of the superfine refractory on a plus addition basis, although broadly from 2 to 15 wt. % can be utilized The specific amount added depends, of course, on the other components of the mix. The optimum amount of superfine refractory for any given composition is determined empirically and coincides with the minimum required to avoid slumping or falling.

The preferred mixes consist of:

For general use below 2400° F.

| Low iron cement containing approximately 34% lime (CaO) | Approx. 30 wt. % |
|---|---|
| Microsilica, −325 m | Approx. 7 wt. % |
| High plasticity ball clay, −3251 | Approx. 3 wt. % |

An aggregate mixture of approximately 50 wt. % pyrophyllite and approximately 12 wt. % perlite produced an in-place density of approximately 60 pcf.

For temperatures above 2400° F.

| High purity cement containing approximately 26% lime (CaO) | Approx. 17 wt. % |
|---|---|
| Microsilica, −325 m | Approx. 5 wt. % |
| High plasticity ball clay, −325 m | Approx. 2 wt. % |

An aggregate mixture of approximately 45 wt. % calcined fireclay, approximately 30 wt. % −100m kyanite and approximately 5 wt. % perlite produced an in-place density of approximately 90 pcf.

The compositions are prepared by admixing the components at the time of use and simply adding water to form a pumpable mixture. The density, depending upon the aggregates used, can vary widely from 20 to 120 pcf, preferably from 30 to 90 pcf.

The invention will be further described in connection with the following examples, which are set forth for purposes of illustration only, and in which proportions are wt. % unless specifically stated to the contrary.

EXAMPLES 1 TO 8

A series of eight mixes was prepared. Examples 3, 4, 5, 7 and 8 are in accord with the present invention and the others are included for comparison.

The components of each mix are set forth in Table I below and Table II below shows the test results for mixes in the 60 and 90 pcf density ranges. The mixes were both cast and sprayed and their application characteristics in terms of castability, pumpability and sprayability were noted.

Mixes 3, 4, and 5 were preferred 90 pcf mixes in terms of their ease of pumpability, sprayability, and adherence when sprayed overhead. Mix 8 was the preferred 60 pcf composition.

TABLE 1

| Example No: | 1 | 2 | 3–4 | 5 | 6 | 7 | 8 |
|---|---|---|---|---|---|---|---|
| Mix: | | | | | | | |
| Superduty Flintgrain, −28 mesh thru fines | 45% | 45% | 45% | 45% | — | — | — |
| Crude Kyanite, −100 | 30 | 30 | 30 | 30 | — | — | — |
| Calcium-Aluminate Cement (A) | 18 | 18 | 18 | 18 | — | — | — |
| Perlite, #10 grade | 5 | 5 | 5 | 5 | 12% | 12% | 12% |
| Ball Clay | 2 | 2 | 2 | 2 | 3 | 3 | 3 |
| Pyrophyllite, −16 mesh | — | — | — | — | 51.5 | 51.5 | 51.5 |
| Calcium-Aluminate Cement (D) | — | — | — | — | 32.5 | 32.5 | 32.5 |
| Fiberglass | — | — | — | — | 0.5 | 0.5 | 0.5 |
| Milled Newspaper | — | — | — | — | 0.5 | 0.5 | 0.5 |
| Plus Additions: | | | | | | | |
| All Purpose Flour | — | 1.0 | — | — | — | — | — |
| Microsilica | — | — | 10 | 7 | — | 5 | 7 |

Note:
Cement A = 28.5% CaO, 1.0% impurities
Cement D = 33.5% CaO, 10.8% impurities

TABLE II

| Example No: | 1 | 2 | 3 | 4 | 5 | 6 | 7 | 8 |
|---|---|---|---|---|---|---|---|---|
| Density Classification, pcf | | | 90 | | | | 60 | |
| Water Addition* | 24% | 1300 l/hr | 775 l/hr | 825 l/hr | 900 l/hr | — | 1400 l/hr | 1200 l/hr |
| Overhead Adherence | Poor | Poor | Exc. | Exc. | Exc. | Poor | Good | Exc. |
| Mix Details: | Cast Data | Not Tested (Poor Adherence) | Sprayed Data | Sprayed Data | Sprayed Data | Sprayed Data | Sprayed Data | Sprayed |
| Bulk Density, pcf | | | | | | | | |
| After Drying at 250° F. | 98 | — | 101 | 89 | 98 | 61 | 62 | 67 |
| After 1500° F. Reheat | 93 | — | 96 | 81 | 91 | 54 | 57 | 59 |
| After 2000° F. Reheat | — | — | — | — | — | — | 55 | 61 |
| After 2500° F. Reheat | 89 | — | 96 | 81 | 92 | — | — | — |

TABLE II-continued

| Example No: | 1 | 2 | 3 | 4 | 5 | 6 | 7 | 8 |
|---|---|---|---|---|---|---|---|---|
| Modulus of Rupture, psi | | | | | | | | |
| After Drying at 250° F. | 330 | — | — | — | 400 | 50 | — | 290 |
| After 1500° F. Reheat | 210 | — | — | — | 330 | 70 | — | — |
| Cold Crushing Strength, psi | | | | | | | | |
| After Drying at 250° F. | 1090 | — | — | — | 910 | 200 | — | — |
| After 1500° F. Reheat | 1050 | — | — | — | 940 | 140 | — | 390 |
| 1500° F. Reheat | | | | | | | | |
| % Linear Change: | −0.3 | — | −0.4 | −0.3 | −0.3 | 0.0 | 0.0 | +0.2 |
| % Volume Change: | −1.3 | — | −1.4 | −1.6 | −1.6 | — | +0.4 | +0.2 |
| 2500° F. Reheat | | | | | | | | |
| % Linear Change: | +1.2 | — | 0.0 | −0.1 | −0.1 | — | — | — |
| % Volume Change: | +0.6 | — | −0.8 | −0.4 | −1.1 | — | — | — |
| 2000° F. Reheat | | | | | | | | |
| % Linear Change: | — | — | — | — | — | −0.5 | −0.9 | −0.2 |
| % Volume Change: | — | — | — | — | — | — | −3.4 | −1.2 |

*Note:
Water additions in wt. % or liters/hr.

EXAMPLES 9 THROUGH 16

A further series of eight mixes was prepared whose formulations are set forth in Table III below. Mixes 9 to 16 had densities of 30 pcf.

The mix formulations are set forth in Table III below and the test results are set forth in Table IV.

These results showed that if the styrofoam beads content increased beyond 2% that pumpability of 30 pcf mixes was compromised. However, the pumpability of these mixes could be improved by the use of 3 wt. % crushed styrofoam (compare mixes 12 and 13 to mixes 9, 10, and 11). The results of mixes 14 to 16 indicated that pumpable 30 pcf mixes could be sprayed and the overhead adherence of these mixes was very good.

TABLE III

| Example No: | 9 | 10 | 11 | 12 | 13 | 14 | 15 | 16 |
|---|---|---|---|---|---|---|---|---|
| Mix: | | | | | | | | |
| Pyrophyllite | 56% | 55% | 54% | 55% | 55% | 55% | 40% | 30% |
| Calcium-Aluminate Cement (D) | 30 | 30 | 30 | 30 | 30 | 30 | 45 | 55 |
| Microsilica | 9 | 9 | 9 | 9 | 9 | 9 | 9 | 9 |
| Ball Clay | 3 | 3 | 3 | 3 | 3 | 3 | 3 | 3 |
| Styrofoam Beads | 2 | 3 | 4 | — | — | — | — | — |
| Crushed Styrofoam | — | — | — | 3 | 3 | 3 | 3 | 3 |
| Plus Additions: | | | | | | | | |
| Xanthan Gum | — | — | — | — | 0.1 | — | 0.1 | 0.1 |
| Methylcellulose | — | — | — | — | — | 0.1 | — | — |

Note:
Cement D = 33.5% CaO, 10.8% impurities

TABLE IV

| Mix Designation: | 9 | 10 | 11 | 12 | 13 | 14 | 15 | 16 |
|---|---|---|---|---|---|---|---|---|
| Density Classification, pcf. | | | | | 30 | | | |
| Water Rate | — | — | — | — | — | — | 700 l/hr | 700 l/hr |
| Overhead Adherence | — | — | — | — | — | — | V. Good | V. Good |
| Styrofoam Content | 2% | 3% | 4% | 3% | 3% | 3% | 3% | 3% |
| Mix Details: | Cast | Cast | Cast | Cast | Cast | Cast | Sprayed | Sprayed |
| % Water for Casting: | 46 | 46 | 46 | 46 | 50 | 55 | — | — |
| Pumpability: | Pumpable | Marginal | Not Pumpable | Pumpable | Pumpable | Pumpable | Some Pulsing | Some Pulsing |
| Bulk Density, pcf | | | | | | | | |
| After Drying at 230° | 49 | 41 | 33 | 38 | — | — | 42 | 41 |
| After 1500° F. Reheat | 43 | 35 | 28 | 33 | — | — | 35 | 33 |
| Modulus of Rupture, psi | | | | | | | | |
| After Drying at 230° F. | — | — | — | — | — | — | 170 | 170 |
| After 1500° F. Reheat | — | — | — | — | — | — | 30 | 20 |
| Cold Crushing Strength, psi | | | | | | | | |
| After Drying at 230° F. | — | — | — | — | — | — | 130 | 100 |
| After 1500° F. Reheat | — | — | — | — | — | — | 50 | 30 |
| 1500° F. Reheat | | | | | | | | |
| % Linear Change: | +0.4 | +0.4 | +0.5 | +0.6 | — | — | +0.2 | +0.1 |
| % Volume Change: | +0.7 | +0.9 | +1.0 | +1.1 | — | — | +0.2 | −0.3 |
| 2000° F. Reheat | | | | | | | | |
| % Linear Change: | — | — | — | — | — | — | −0.4 | −0.7 |
| % Volume Change: | — | — | — | — | — | — | −2.4 | −2.5 |

EXAMPLES 17 THROUGH 35

To investigate pumpable mixes using other refractory aggregates, a series of nineteen mixes using vitreous silica as the aggregate was made. The compositions are set forth in Table V below. Shapes were prepared from such mixes and tests including abrasion resistance were performed. These results are set forth in Table VI below.

A review of these mixes shows that mix 35, which contain the most cement, had the most desirable set of physical properties (that is, highest density, lowest abrasion loss, and good volume stability). Table VI shows cast properties of mixes 17 to 35. These mixes were also sprayed, but because it was necessary to use a particular type of mixer, additional water was required to obtain a sprayable consistency, and properties were inferior to those for cast shapes. However, given use of a proper mixer, the sprayed properties of these mixes should be comparable to cast properties.

These examples show that compositions utilizing only dense aggregates without any lightweight additives can be utilized. It is, however, preferred to use mixes with such additives.

TABLE V

| Example No: | 17 | 18 | 19 | 20 | 21 | 22 | 23 | 24 | 25 | 26 | 27 |
|---|---|---|---|---|---|---|---|---|---|---|---|
| Mix: | | | | | | | | | | | |
| Vitreous Silica, 4/10 mesh | 40% | — | — | — | — | — | — | — | — | — | — |
| Vitreous Silica, 10/28 | 12 | 52% | 30% | 30% | 20% | 15% | 15% | 15% | 15% | 15% | 15% |
| Vitreous Silica, 28/65 | — | — | 11 | 11 | 13 | 13 | 13 | 13 | 13 | 13 | 13 |
| Vitreous Silica, −65 | 7 | 7 | 13 | 10 | 15 | 20 | 14 | 14 | 14 | 14 | 14 |
| Vitreous Silica, −80 | — | — | — | — | — | — | 6 | 6 | 6 | 6 | 6 |
| Superduty Flintgrain, BMF 55 | 20 | 20 | 20 | 20 | 15 | 15 | 15 | 15 | 15 | 15 | 15 |
| Calcium-Aluminate Cement (A) | 7 | 7 | 12 | 12 | 30 | 30 | 30 | 30 | 30 | 30 | 30 |
| Microsilica | 7 | 7 | 7 | 10 | 7 | 5 | 5 | 5 | 5 | 5 | 5 |
| Ball Clay | — | — | — | — | — | 2 | 2 | 2 | 2 | 2 | 2 |
| Calcined Alumina, −325 | 7 | 7 | 7 | 7 | — | — | — | — | — | — | — |
| Plus Additions: | | | | | | | | | | | |
| Trisodium Polyphosphate | — | — | — | — | — | — | 0.1 | 0.05 | 0.1 | 0.1 | 0.1 |
| Methylcellulose | — | — | — | — | — | — | — | — | 0.2 | 0.1 | — |
| Xanthan Gum | — | — | — | — | — | — | — | — | — | — | 0.1 |

TABLE V-continued

| Example No: | 28 | 29 | 30 | 31 | 32 | 33 | 34 | 35 |
|---|---|---|---|---|---|---|---|---|
| Mix: | | | | | | | | |
| Vitreous Silica, 10/28 mesh | 13% | 15% | 12% | 15% | 15% | 15% | 15% | 12% |
| Vitreous Silica, 28/65 | 12 | 13 | 10 | 13 | 13 | 13 | 13 | 10 |
| Vitreous Silica, −65 | 12 | 14 | 10 | 14 | 14 | 14 | 14 | 11 |
| Vitreous Silica, −80 | 6 | 6 | 6 | 4 | 2 | 6 | 6 | — |
| Superduty Flintgrain, BMF 55 | 15 | 15 | 15 | 15 | 15 | 15 | 15 | 15 |
| Microsilica | 5 | 5 | 5 | 7 | 9 | 5 | 5 | 5 |
| Ball Clay | 2 | 2 | 2 | 2 | 2 | 2 | 2 | 2 |
| Calcium-Aluminate Cement (B) | 35 | 30 | 40 | 30 | 30 | — | — | 45 |
| Calcium-Aluminate Cement (C) | — | — | — | — | — | 30 | 30 | — |
| Plus Additions: | | | | | | | | |
| Trisodium Polyphosphate | 0.1 | 0.1 | 0.1 | 0.1 | 0.1 | 0.1 | — | 0.1 |
| Methylcellulose | — | — | — | 0.1 | 0.1 | 0.1 | 0.1 | 0.1 |
| Xanthan Gum | 0.1 | 0.1 | 0.1 | — | — | — | 0.1 | — |

Note:
Cement A = 28.5% CaO, 1.0% impurities
Cement B = 28.5% CaO, 1.5% impurities
Cement C = 18.3% CaO, 1.2% impurities

TABLE VI

| Example No: | 17 | 18 | 19 | 20 | 21 | 22 | 23 | 24 | 25 | 26 | 27 |
|---|---|---|---|---|---|---|---|---|---|---|---|
| % Water for Casting | 16 | 20 | 18 | 21 | 20 | 22 | 16 | 20 | 18 | 18 | 17 |
| Pumpability* | U | E | G | G | G | G | G | G | G | G | G |
| Bulk Density, pcf | | | | | | | | | | | |
| After Drying at 230° F. | — | — | — | — | — | — | — | — | — | — | 116 |
| After 1500° F. Reheat | — | — | 105 | — | — | 99 | 109 | — | — | — | 106 |
| 1500° F. Reheat | | | | | | | | | | | |
| % Linear Change: | — | — | 0.0 | — | — | −0.2 | −0.2 | — | — | — | −0.3 |
| % Volume Change: | — | — | +1.2 | — | — | +1.0 | +1.0 | — | — | — | −1.0 |
| ASTM C-704 Abrasion Test After 1500° F. Reheat | | | | | | | | | | | |
| Volume Eroded: cc | — | — | 111 | — | — | 54 | 20 | — | — | — | 29 |

| Example No: | 28 | 29 | 30 | 31 | 32 | 33 | 34 | 35 |
|---|---|---|---|---|---|---|---|---|
| % Water for Casting | 17 | 17.5 | 17 | 15.5 | 14.5 | 15.6 | 15.6 | 16.5 |
| Pumpability* | G | G | G | G | G | G | G | G |
| Bulk Density, pcf | | | | | | | | |
| After Drying at 230° F. | 119 | 114 | 123 | 119 | 121 | 116 | 116 | 124 |
| After 1500° F. Reheat | 107 | 105 | 109 | 109 | 111 | 110 | 111 | 111 |
| 1500° F. Reheat | | | | | | | | |
| % Linear Change: | −0.2 | −0.3 | −0.3 | −0.3 | −0.4 | −0.5 | −0.3 | −0.5 |
| % Volume Change: | −1.2 | −1.8 | −0.2 | −1.2 | −2.1 | −0.5 | −1.2 | −1.3 |
| ASTM C-704 Abrasion Test After 1500° F. Reheat | | | | | | | | |
| Volume Eroded: cc | 26 | 36 | 23 | 20 | 17 | 31 | 33 | 17 |

*Note:
E = Excellent  G = Good  U = Unsatisfactory

EXAMPLES 36 AND 37

Two insulating spray mixes were prepared having the compositions noted in Table VII below.

TABLE VII

| Example No: | 36 | | 37 | |
|---|---|---|---|---|
| Mix: | | | | |
| Superduty Flintgrain, −28 mesh thru fines | 45% | | — | |
| Kyanite, −100 m | 30 | | — | |
| Calcium-Aluminate Cement (A) | 18 | | — | |
| Perlite | 5 | | 12% | |
| Ball Clay | 2 | | 3 | |
| Pyrophyllite | — | | 51.5 | |
| Calcium-Aluminate Cement (D) | — | | 32.5 | |
| Fiberglass | — | | 0.5 | |
| Milled Newspaper | — | | 0.5 | |
| Plus Additions: | | | | |
| Microsilica | 5.5 | | 7 | |
| Screen Analysis | | | | |
| % Held on 8 mesh | — | | Tr | |
| 10 | Tr | Tr | 2 | 2 |
| 14 | 1 | | 2 | |
| 20 | 2 | | 6 | |
| 28 | 2 | 5 | 6 | 14 |
| 35 | 7 | | 8 | |
| 48 | 6 | | 4 | |
| 65 | 6 | 19 | 4 | 16 |
| 100 | 6 | | 2 | |
| 150 | 7 | 13 | 4 | 6 |
| 200 | 8 | | 4 | |
| 270 | 6 | | 4 | |
| 325 | 4 | 18 | 4 | 12 |
| Pass 325 mesh | 45 | 45 | 50 | 50 |

Note:
Cement A = 28.5% CaO, 1.0% impurities
Cement D = 33.5% CaO, 10.8% impurities The above mixes were admixed with water to form sprayable compositions and sprayed onto overhead targets to various thicknesses and tested. The results are set forth in Table VIII below.

TABLE VIII

| Example No: | 36 | 37 |
|---|---|---|
| Air Pressure, psi: | 35 | 35 |
| Water Rate for Spraying | 900 l/hr | 1200 l/hr |
| Data on Sprayed Samples | | |
| Bulk Density, pcf | | |
| After Drying at 230° F. | 92 | 67 |
| After 1500° F. Reheat | 87 | 59 |
| After 2000° F. Reheat | — | 61 |
| After 2500° F. Reheat | 86 | — |
| Modulus of Rupture, psi | | |
| After Drying at 230° F. | 380 | — |
| After 1500° F. Reheat | 290 | 290 |
| Cold Crushing Strength, psi | | |
| After Drying at 230° F. | 1650 | — |
| After 1500° F. Reheat | 1020 | 390 |
| 1500° F. Reheat | | |
| % Linear Change: | −0.6 | +0.2 |
| % Volume Change: | −1.2 | +0.2 |
| 2000° F. Reheat | | |
| % Linear Change: | — | −0.2 |
| % Volume Change: | — | −1.2 |
| 2500° Reheat | | |
| % Linear Change: | −0.1 | — |
| % Volume Change: | −0.9 | — |
| Data on Cast Samples | | |
| % Water to Cast: | — | 52 |
| Bulk Density, pcf | | |
| After Drying at 250° F.: | — | 63 |
| ASTM Thermal Conductivity | | |

| Mean Temp (°F.) | K* | Mean Temp (°F.) | K* |
|---|---|---|---|
| 500 | 3.9 | 480 | 2.8 |
| 1180 | 3.3 | 1130 | 2.3 |
| 1760 | 3.7 | 1490 | 2.3 |
| 1410 | 3.6 | 1290 | 2.2 |
| 1050 | 3.5 | 1020 | 2.1 |
| 680 | 3.5 | 630 | 2.1 |
| 300 | 3.5 | 300 | 2.0 |

*BTU/sq.ft.hr. °F./in.

These compositions could be mixed homogeneously and sprayed without any difficulties. They were sprayed onto overhead surfaces to a substantial thickness of 8.5 and 7 inches, respectively, without falling.

This work indicated that pyrophyllite, a low cost refractory mineral $AlSi_2O5(OH)$, could also be used as the dense refractory aggregate, along with perlite, a lightweight aggregate in stable overhead spray mixes. It is envisioned that other lower density aggregates such as calcined shale, bubble alumina, and the like described earlier could be used as aggregates in similar mixes. It is also envisioned that these lightweight spray mixes could contain aluminum resistant additives, additions of silicon carbide to hinder slag penetration, steel fibers, glass fibers, or organic fibers.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A pulverulent mix, sprayable overhead when mixed with a liquid, for forming a stable, non-slumping cement-bonded insulating refractory consisting essentially of for each 100 wt. % thereof, a dense refractory aggregate or a mixture of a dense and a lightweight refractory aggregate, a calcium aluminate cement, a plasticizer, and 2 to 15 wt. % −10 micron superfine refractory, wherein from about 40 to 60 wt. % of the total mix is −325 mesh.

2. The mix of claim 1 wherein said dense refractory aggregate is a calcined fireclay pyrophyllite, vitreous or fused silica, or a mixture thereof, said superfine refractory is a microsilica, reactive alumina, pigment grade chromic oxide, or mixture thereof having a particle size of no greater than about 5 microns, and said plasticizer is ball clay, bentonite, or an organic plasticizing compound.

3. The mix of claim 1 consisting of 45 to 88 wt. % aggregate, 10 to 40 wt % cement, 1 to 10 wt % microsilica, and 1 to 5 wt. % ball clay.

4. The mix of claim 2 consisting of 45 to 88 wt. % aggregate, 10 to 40 wt. % cement 1 to 10 wt. % microsilica, and 1 to 5 wt. % ball clay.

5. A pumpable non-slumping spray composition consisting the mix of claim 1 admixed with water to form a pumpable mixture having a density of about 20 to 120 pcf.

6. The composition of claim 5 wherein said dense refractory aggregate is a calcined fireclay, pyrophyllite, vitreous or fused silica, or a mixture thereof and said superfine refractory is a microsilica, ball clay, reactive alumina, pigment grade chromic oxide, or mixture thereof having a particle size of no greater than about 5 microns, and said plasticizer is ball clay, bentonite, or an organic plasticizing compound.

7. The composition of claim 5 consisting of 45 to 88 wt. % aggregate, 10 to 40 wt. % cement, 1 to 10 wt. % microsilica, and 1 to 5 wt. % ball clay.

8. The composition of claim 6 consisting of 45 to 88 wt. % aggregate, 10 to 40 wt. % cement, 1 to 10 wt. % microsilica, and 1 to 5 wt. % ball clay.

9. A non-slumping sprayed lining composition for high temperature vessels consisting essentially of for each 100 wt. % thereof, a dense refractory aggregate, or a mixture of a dense and lightweight refractory aggregate, a calcium aluminate cement, and 5 to 10 wt. % −10 micron superfine refractory, wherein from 40 to 60 wt. % of the total lining composition is −325 mesh.

10. The lining composition of claim 9 wherein said dense refractory aggregate is a calcined fireclay, pyrophyllite, vitreous or fused silica, or a mixture thereof and said superfine refractory is a microsilica, ball clay, reactive alumina, pigment grade chromic oxide, or mixture thereof having a particle size of no greater than about 5 microns and said plasticizer is ball clay, bentonite, or an organic plasticizing compound.

11. The lining composition of claim 10 consisting of 45 to 88 wt. % aggregate, 10 to 40 wt. % cement, 1 to 10 wt. % microsilica, and 1 to 5 wt. % ball clay.

* * * * *